(12) United States Patent
Mahn, Jr.

(10) Patent No.: US 6,197,144 B1
(45) Date of Patent: Mar. 6, 2001

(54) METHOD OF DECORATING A POLYETHYLENE SPLASH GUARD

(76) Inventor: John Mahn, Jr., 6154 Oakhaven Dr., Cincinnati, OH (US) 45201

( * ) Notice: Subject to any disclaimer, the term of this patent is extended or adjusted under 35 U.S.C. 154(b) by 0 days.

(21) Appl. No.: 09/456,675

(22) Filed: Dec. 9, 1999

Related U.S. Application Data

(62) Division of application No. 08/781,406, filed on Jan. 16, 1997, now Pat. No. 6,013,351.

(51) Int. Cl.$^7$ ..................................................... B44C 11/00
(52) U.S. Cl. ........................ 156/240; 156/233; 156/239
(58) Field of Search ................................ 156/233, 239, 156/240; 427/195, 500

(56) References Cited

U.S. PATENT DOCUMENTS 4,971,646 * 11/1990 Schell et al. ........................ 156/224

\* cited by examiner

*Primary Examiner*—William Krynski
*Assistant Examiner*—Michael E Grendzynski
(74) *Attorney, Agent, or Firm*—Wood, Herron & Evan LLP

(57) ABSTRACT

Thermoplastic articles such as splash guards, in particular polyethylene splash guards, are decorated using a heat-activated decorative which includes a layer of a compatible thermoplastic adhesive which bonds an intermediate support sheet to the surface of the article. An indicia layer is then bonded to the support sheet. The support sheet is either a nonwoven web, a metal film, or a metalized cloth. The indicia layer can be an outer reflective or polymeric film bonded to the polyester nonwoven web using a compatible adhesive such as a linear alkyl polyester. If the support sheet is a metal film or metalized cloth, it can provide the indicia without a separate layer. However, a clear protective film may be required. This material remains tightly adhered to the surface of the article, even splash guards subjected to road conditions.

4 Claims, 2 Drawing Sheets

METHOD OF DECORATING A POLYETHYLENE SPLASH GUARD

This application is a division of Ser. No. 08/781,406, filed Jan. 10, 1997, now U.S. Pat. No. 6,013,351.

BACKGROUND OF THE INVENTION

Splash guards or mud flaps used on large and small trucks are generally made from different materials. Some are formed from reformulated blends of ground rubber. Others are formed from either high- or low density polyethylene and some are formed from other thermoplastics such as ethylene vinyl acetate. These may be filled or unfilled.

Purchasers of these splash guards may wish to have the splash guards decorated with some ornamental material, or covered with a reflective material. Unfortunately, it is extremely difficult to keep a decorative adhered to a thermoplastc surface. This is also a problem with other thermoplastic articles such as coolers, yard signs and the like.

One can form a decorative by melting portions of the surface or debossing the surface of the thermoplastic article to form an indented area which is marked with .a colored foil. But this is only cost effective if one manufactures a very large number of splash guards with the same decorative. Screen printing can also be used, but this wears off. Further, this method cannot be used to apply a reflective material.

If someone wants to manufacture five or ten marked splash guards, such a method is cost prohibitive. Unfortunately, one cannot simply use an adhesive to adhere material to thermoplastics such as polyethylene and EVA. Due to their nature, they are not compatible with most adhesives. Polyethylene adhesives should adhere to a polyethylene splash guard. But a polyethylene decorative tends to smear when applied. It is also soft and non-scratch resistant. Therefore, until now simply adhering a decorative to the surface of the thermoplastic splash guard has not been effective for small quantities.

SUMMARY OF THE INVENTION

The present invention is premised on the realization that a decorative can be adhered to the surface of a thermoplastic article such as a splash guard by forming the decorative with a lower surface of a compatible low-melting-point thermoplastic adhesive, having one side thereof embedded onto a first surface of a support sheet. A decorative can then be adhered to the second or apposite surface of this support sheet. This entire structure can be bonded to a splash guard by melting the low-melting-point thermoplastic adhesive and pressing it against the surface of the splash guard.

The outer decorative surface can be a wide variety of different surfaces. It can be, for example, a colored film cut to size to form any desired indicia. It can be multi-colored films bonded to each other. It can also be reflective material or even reflective particulate material such as glass beads and the like embedded in a plastic matrix. The support sheet is either a porous material such as a nonwoven web, or preferably a metal such as a metal foil, metalized cloth, or a metalized film. When the support layer is metal or a metalized material, the support sheet itself can provide the outer decorative or reflective surface.

A decorative, according to the present invention, can be cut to size and then simply applied to individual thermoplastic splash guards by applying heat and pressure for sufficient time to melt the thermoplastic adhesive. The thermoplastic adhesive is selected so that it Is compatible with the splash guard and melts at a temperature lower than the splash guard and lower than the decorative layer.

This decorative will remain firmly adhered to the splash guard over a wide variety of different temperature ranges and conditions typically encountered by splash guards. They are not subject to peeling or cracking. Because of the support layer, they do not smear when applied. Thus, they provide a unique way to attach a durable decorative onto the surface of a polyethylene splash guard. Further, when the support layer is metal, it can provide a reflective surface for improved safety.

The objects and advantages of the present invention will be further appreciated in light of the following detailed description and drawings in which:

DETAILED DESCRIPTION

Figure 1:
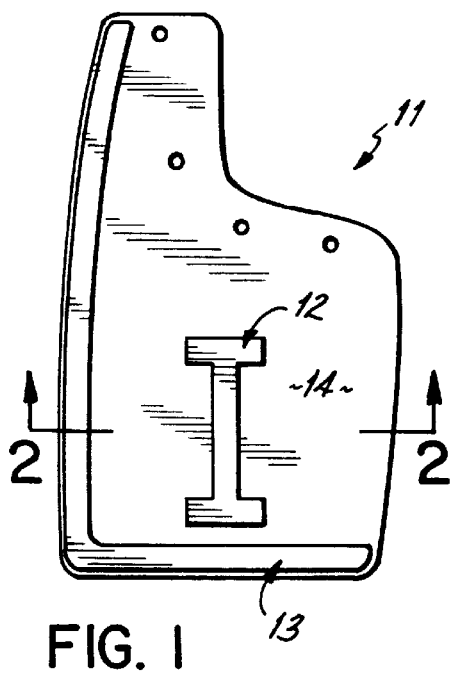
FIG. 1 is an elevational view of a splash guard incorporating the present invention

The present invention provides a method to mark a thermoplastic article such as the splash guard 11 shown in FIG. 1 with various indicia or decoratives. The present invention is particularly useful in marking splash guards because it withstands very severe conditions. However, it can be used for a wide variety of thermoplastic articles such as coolers, toys, yard signs, light covers and the like. These can be formed from polymers such as polyethylene, polypropylene and other polyolefins and ethylene vinyl acetate. The present invention is particularly described with respect to a splash guard (mud flap). However, the invention can be used to mark the other thermoplastic articles, as well. Further, the shape of splash guard shown in FIG. 1 is exemplary. The size and shape of the splash guard varies, depending on the vehicle to which it is attached.

As shown in FIG. 1, there are two decoratives marking splash guard 11. The first decorative 12 is an ornamental decorative. As shown, it is in the form of a letter, although virtually any shape indicia can be formed using the present invention. The second decorative 13 lines the peripheral edge of the splash guard 11 and might serve a more utilitarian purpose such as providing a reflective surface. This decorative 13 is a reflective decorative.

Figure 2:
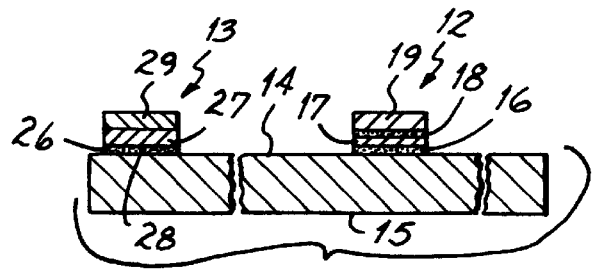
FIG. 2 is a cross-sectional view of FIG. 1 taken at lines 2—2.

As shown more particularly in FIG. 2, the splash guard 11 includes a first surface 14 which would typically face away from a tire, and a second surface 15 which would typically face the vehicle. The decoratives 12 and 13 are adhered to surface 14 by thin thermoplastic adhesive films 16 and 26, respectively (see FIG. 2).

Above the film 16 of decorative 12 is a support sheet 17 which is partially embedded into the film 16. A layer of adhesive 18 then adheres the indicia layer 19 to the support sheet 17.

The adhesive layers 16 and 26 should be a low-melting-point thermoplastic adhesive film. Generally, the thickness of this film will be from about 1 to about 8 mils, with about 3 mils preferred. The adhesive must be compatible with the thermoplastic which forms the splash guard. If the splash guard is polyethylene, the adhesive is preferably simply polyethylene or a polyethylene blend. If the splash guard is ethylene vinyl acetate, the adhesive film 10 should also be EVA or compatible polyethylene.

As indicated, the adhesive 16 should have a low melting point. It must melt at a temperature lower than the melting or decomposition temperature of support sheet 17. Also, it must have a melting or application temperature which is below the melting temperature of the splash guard. Preferably, it should have a melting point or application temperature at or below 230° F. This can be modified, depending upon the melting point of the support sheet 17. Two preferred adhesives are Dow®709 and Dow®899. Of course, if the splash guard was formed from ethylene vinyl acetate, an ethylene vinyl acetate composition such as Dupont Elvax 460 would be used.

Support sheet 17 must provide a three-dimensional matrix to physically bind the adhesive 18 to the adhesive layer 18. The support sheet 17 is preferably a random fibrous web of material which will embed within the film 16. This can be formed from a wide variety of both thermoplastic and thermoset polymeric materials, so long as they are not water-degradable or soluble, such as natural fibers. Preferably, the fibrous web will be from about 5 to 30 mils thick, although the exact thickness is not critical for the present invention. Approximately 14 mils has been found to function quite well in the present invention. One preferred nonwoven web is formed from polyester material. In particular, two brands that function in the present invention are Reemay 2014, manufactured and sold by Reemay Incorporated of Nashville, Tenn., as well as the Pellon brand of nonwoven fibrous polyester. Other nonwoven webs can be formed from polyamides and polyethylene, and further, polyurethane foams can also be used, as well as woven material. However, these are less durable and aesthetically less appealing..

Intermediate the indicia layer 19 and the nonwoven web 17 is an adhesive layer 18. The adhesive layer 18 must simply be one which is compatible with the support sheet 17. This layer may not be necessary if the outer layer can provide indicia and will adhere to web 17. For example, if the indicia layer is a vinyl material, the adhesive layer 18 is not necessary.

The adhesive can be selected from a wide variety of different adhesives, both thermoplastic and thermoset adhesives. Suitable adhesives include polyurethane thermoplastic adhesives, polyester thermoplastic and thermosettable adhesives, or polyamide thermoplastic adhesives. These are all well known and commercially available.

One preferred adhesive for use in the present invention is a thermosetable adhesive, specifically a thermosetable film of a linear, saturated polyester polymer which includes a heat-activated curing agent. The uncured polyester itself is a linear alkyl unsaturated polyester formed by reacting a glycol with a diacid, which incorporates a heat-activated curing agent such as a blocked isocyanate. One preferred brand of adhesive is Bostik adhesive 10-300-3, which is a thermosetting linear saturated polyester adhesive which uses an isocyanate curing agent and polyester formed from ethylene glycol and methyl terephthalic add. This can be dissolved in a solvent such as methylethyl ketone and methylene chloride, formed into a film, and dried at 250° to 325° F. This can be laminated by heating it to a temperature of 330° F., which will cause the film to liquify and then set.

Other adhesives that would be suitable for use in the present invention include EMS 1G, a nylon adhesive, and Bostik 4117, a polyester.

The upper indicia layer can be virtually any material which will withstand road conditions. These can be, for example, a thermoplastic resin film or a thermoset resin film. Suitable thermoset layers would include polyamides, thermoset polyurethanes, thermoset polyolefins, thermoset epoxies, and thermoset polyesters. One preferred thermoset polyurethane is a polyurethane ink sold as Zepherlon by Sinclair and Valentine Chemical Coatings of Wheelabrator Fry, Inc.

Suitable thermoplastics include vinyl such as PVC, polyamides, polyolefins, polyesters, and the like and blends such as Chemigum 4050 (vinyl and rubber).

The upper indicia layer can be, for example, an elastomeric film, particularly a thermoplastic elastomeric film. Suitable brands include Vyram sold by AES, Housmex SBR and Enichem SBS. The indicia layer can also be a reflective material or reflective tape.

With respect to indicia 13, this product has a support sheet 27 which includes a metal surface. Support sheet 27 can be, for example, a thin metal film, a metalized cloth such as a lame, metal coated particulate material, or even metal fibers or a metal fibrous web. Preferably, support layer 27 will be a reflective sheet. The lower surface 28 of support sheet 27 is preferably corona treated prior to formation of the decorative sheet 13, as will be discussed below.

The upper surface 29 of indicia 13 is preferably simply a thin, clear film which protects the support sheet 27, although it can be the same as layer 19 of Indicia 12 and can be virtually any color, depending on its intended purpose. With respect to certain support sheets, this film 29 is optional. For example, if an outer gold lame appearance is preferred, no outer film is used.

This indicia 13 can have a wide variety of different appearances. The support sheet 27 can be coated beads to provide a reflective material, or simply can be a metal film with the upper layer being a polyester protective layer such as a Mylar® brand layer. The outer surface of support sheet 27 can even have a holographic surface so that a glittery rainbow affect is provided.

With respect to indicia 13, the adhesive layer 26 remains the same as with respect to indicia 12. Adhesive layer 18 is optional and is not part of indicia 13. Outer layer 29 can be bonded to support sheet 27 without an adhesive. For example, support sheet 27 can be metal film coated onto a polyester, i.e., Mylar® film. The metal film is adhered directly to the adhesive 16. With respect to an embodiment wherein the outer surface is lame, there is no outer layer 29 and obviously no adhesive layer (similar to adhesive layer 18) is required.

If, for example, the support layer is a layer of metal beads, an adhesive layer (such as 18) would be required. Those adhesives referenced with respect to layer 18 of indicia 12 can be employed.

Figure 3:
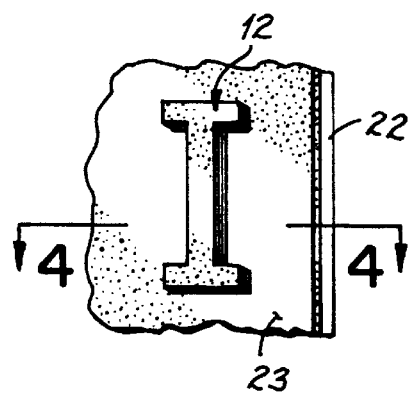
FIG. 3 is a perspective view of a decorative for use in the present invention.
Figure 5:
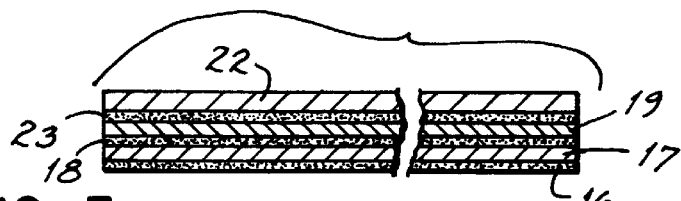
FIG. 5 is a cross-sectional view of a laminate for use in manufacturing the decorative shown in FIG. 3.

Decoratives for use in the present invention are preformed and then applied with heat and pressure to the splash guard 11. As shown in FIG. 5, to form the decorative transfer 12, a laminate is formed on a carrier 22. In this particular situation, the carrier 22 includes a pressure-sensitive adhesive layer 23 which temporarily adheres the indicia layer 19 to the carrier 22. Adhesive layer 18 is then laminated to the indicia layer 19, and in turn the support sheet 17 is simultaneously applied to adhesive layer 18. Finally, a layer of thermoplastic adhesive 16 is applied to layer 17 by coating or lamination. This is reverse cut to form indicia 12. The portions surrounding indicia 12 are removed, leaving indicia 12 lightly adhered to carrier 22 (see FIG. 3).

Figure 4:
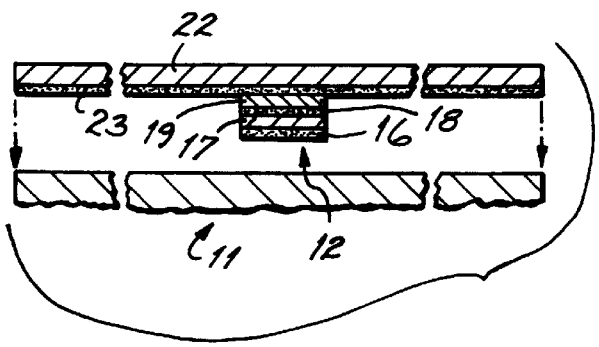
FIG. 4 is a cross-sectional view of FIG. 3 taken at line 4—4.

The indicia is applied to a splash guard, as shown in FIG. 4, with heat and pressure applied against carrier 22 sufficient to cause the thermoplastic layer 16 to melt and bond to the upper surface 14 of splash guard 11.

Figures 6, 7:
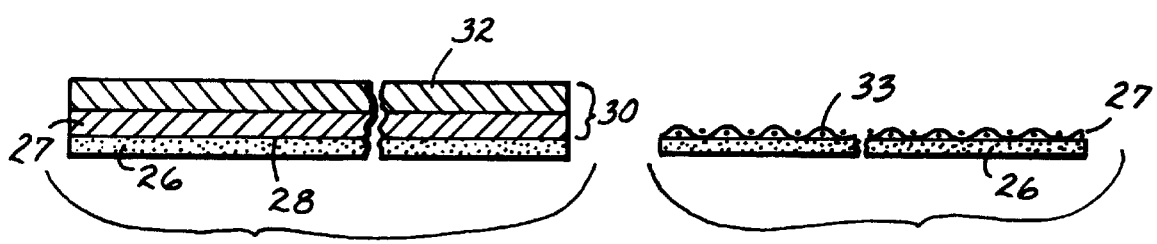
FIG. 6 is a cross-sectional view of an alternate embodiment of the present invention.
FIG. 7 is a cross-sectional view of an alternate embodiment of the present invention.
Figure 8:
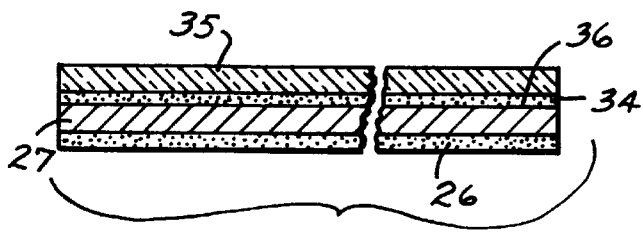
FIG. 8 is a cross-sectional view of another alternate embodiment of the present invention.

Decorative 13 can be formed in a variety of different ways. Exemplary methods are depicted in FIGS. 6, 7 and 8. All three of these have a lower thermoplastic layer 26, as previously discussed. With respect to FIG. 6, the upper portion 30 is a metalized polyester or Mylar® film. The support layer or metal layer 27 has a lower surface 28 which is preferably plasma or corona discharge treated and then laminated with heat and pressure to layer 26. Upper portion 30 is purchased with the metal layer 27 coating the Mylar® or polyester outer layer 32 and therefore no intermediate adhesive is required.

FIG. 7 shows another alternate embodiment where the support sheet 27 is a metalized cloth layer such as a lame which has an exposed outer surface 33. This is simply laminated to thermoplastic adhesive layer 26. Thus, the support sheet provides the indicia as well. In an embodiment not shown, this metalized cloth can be coated with an outer layer similar to layer 19 of indicia 12. In other words, the support sheet 17 would be a metalized cloth layer.

FIG. 8 shows a third alternate embodiment where the support sheet 27 is a metal layer. In this embodiment, the thermoplastic adhesive layer 26 is bonded to a metal layer 27. Again, the bottom surface of the metalized layer is preferably corona treated. In this embodiment, the metal layer can simply be a metal foil. The metal is preferably aluminum or an alloy. However, it can be steel, copper, gold, silver or any other metal that can be formed into a flexible layer. Even more exotic metals such as titanium or vanadium and alloys of these metals can be used. Obviously, highly reactive metals such as sodium would not function as a support layer for practical reasons.

Further, metal layer 27 can have an outer surface 36 which is holographic in nature which is basically a series of microgrooves which defract light. This is bonded by an adhesive layer 34 to an outer protective film 35. The outer protective film can be any transparent layer which can withstand the elements, such as a thermoplastic polyurethane or polyester and the like. Adhesive layer 34 can be the same materials used in adhesive layer 18 of indicia 12.

Indicia formed from the laminates shown in FIGS. 6–8 would be applied in the same manner disclosed with respect to indicia 12 (FIG. 4). As with the support sheet 17 for indicia 12, the metalized layer 27 of FIGS. 6, 7 and 8 prevents delamination from the polyethylene adhesive. The polyethylene adhesive easily bonds to the polyethylene splash guards without marring the surface of the polyethylene splash guards. Of course, with a splash guard formed from ethylene vinyl acetate, the adhesive would likewise be ethylene vinyl acetate.

The present invention enables one to mark thermoplastic articles with a decorative or reflective material. These can be economically produced, minimizing cost, without the need to form an extremely large number of identical items. These are applied to a thermoplastic article without marring the article or the indicia. Further, and very importantly, this decorative remains adhered to the thermoplastic article. The decorative does not crack, peel or delaminate, even when subjected to, for example, the road conditions encountered by splash guards. Thus, the present invention provides a reliable, economical method of decorating and/or modifying the surface of a thermoplastic article.

This has been a description of the present invention, along with the preferred method of practicing the invention currently known to the inventor. However, the invention itself should be defined only by the appended claims wherein we claim:

What is claimed is:

1. A method of decorating the surface of a polyethylene splash guard comprising adhering a support sheet selected from the group consisting of a nonwoven web, a metal film and a metalized cloth to a surface of said splash guard by adhering said support to said surface using a polyethylene thermoplastic adhesive and adhering an indicia layer to said support sheet, said indicia layer comprising an outer indicia-bearing surface and an adhesive layer bonding said support sheet to said outer layer.

2. The method claimed in claim 1 wherein said indicia layer is adhered to said support sheet before said support sheet is adhered to said polyethylene splash guard.

3. The method claimed in claim 1 wherein said indicia comprises a reflective surface.

4. A method of forming a decorated thermoplastic planar article having a first surface comprising;

adhering a support sheet selected from the group consisting of a non-woven web, a metal film and a metalized cloth to a surface of said planar article by thermoplastically adhering said support sheet to said surface using a polyethylene thermoplastic adhesive;

and adhering an indicia layer to said support sheet said indicia layer comprising an outer indicia bearing surface and an adhesive layer bonding said support sheet to said outer layer.

\* \* \* \* \*

UNITED STATES PATENT AND TRADEMARK OFFICE
CERTIFICATE OF CORRECTION

PATENT NO. : 6,197,144 B1
DATED : March 6, 2001
INVENTOR(S) : John Mahn, Jr.

Page 1 of 1

It is certified that error appears in the above-identified patent and that said Letters Patent is hereby corrected as shown below:

Column 1,
Line 11, reads "high- or low density" and should read -- high- or low-density --.
Line 67, reads "so that it Is compatible" and should read -- so that it is compatible --.

Column 2,
Line 17, there is no punctuation. It should read -- present invention. --.

Column 3,
Line 23, reads "adhesive 18" and should read -- adhesive 16 --.
Line 57, reads "a thermosetable adhesive, specifically a thermosetable" should read -- a thermosettable adhesive, specifically a thermosettable --.
Line 66, reads "add." should read -- acid.--.

Column 4,
Line 35, reads "Indicia 12" should read -- indicia 12 --.

Column 6,
Lines 41-52, Claim 4 should be deleted.

Signed and Sealed this

Thirtieth Day of April, 2002

*Attest:*

JAMES E. ROGAN
*Attesting Officer*
*Director of the United States Patent and Trademark Office*